United States Patent [19]

Nakauchi et al.

[11] 4,179,606

[45] Dec. 18, 1979

[54] FLAME SENSOR

[75] Inventors: Shunsaku Nakauchi, Mitaka; Akifusa Takahashi, Tokyo, both of Japan

[73] Assignees: Security Patrols Co., Ltd.; Kokusai Gijutsu Kaihatsu Co., Ltd., both of Tokyo, Japan

[21] Appl. No.: 820,699

[22] Filed: Aug. 1, 1977

[30] Foreign Application Priority Data

Oct. 2, 1976 [JP] Japan ................................ 51-117920

[51] Int. Cl.[2] ............................................ G01J 1/00

[52] U.S. Cl. ...................................... 250/339; 250/340

[58] Field of Search ............... 250/338, 339, 340, 351, 250/503, 554

[56] References Cited

U.S. PATENT DOCUMENTS

| | | | |
|---|---|---|---|
| 3,026,413 | 3/1962 | Taylor | 250/339 |
| 3,539,807 | 11/1970 | Bickel | 250/338 |
| 3,903,418 | 9/1975 | Horn | 250/338 |

*Primary Examiner*—Alfred E. Smith
*Assistant Examiner*—Janice A. Howell
*Attorney, Agent, or Firm*—Cameron, Kerkam, Sutton, Stowell & Stowell

[57] ABSTRACT

A flame sensor according to the invention enables automatic monitoring and/or control of the condition of combustion of a flame such as perfect combustion or imperfect combustion by detection of particular infrared radiations emitted by the flame. The flame sensor includes a rotary disc having two sets of band-pass filters mounted thereon, a single photoelectric conversion device for measuring intensity of radiations having passed said band-pass filters and a division circuit for providing a ratio of an output of the photoelectric conversion device containing the wavelength of a resonant radiation of a carbon dioxide to an output of the photoelectric conversion device containing no such wavelength.

12 Claims, 4 Drawing Figures

FLAME SENSOR

This invention relates to a flame sensor adapted to sense the condition of combustion of a flame by detecting a particular infrared radiation emitted from the flame.

Heretofore there have been proposed various kinds of flame sensors adapted to sense presence of a flame. However no flame sensor of such kind as to enable minute sensing of the condition of the flame such as the condition of combustion being perfect or imperfect or the size of the flame. One of the approaches which have been taken to monitor the condition of the flame in the flare stack of a conventional chemical plant is a system permitting remote monitoring by means of an industrial color television. However, such an approach relies eventually on an operator's eyes and therefore a monitoring operation according to the approach requires perpetual strained condition of the operator with the result that perfect monitoring cannot be expected and the approach is not suitable for automatic control of the condition of combustion.

It has been found in the past that radiation emitted from a bare flame contains to a significant extent middle infrared rays having wavelength in the vicinity of $2\mu$ and $4.3\mu$ to $4.4\mu$ caused by resonant radiation of carbon dioxide peculiar to the flame. It has also been known that an isolated solid carbon exists in a red flame and will become red hot and irradiate a continuous spectrum.

The present invention is directed to a flame sensor by which the condition of combustion of the flame is sensed by use of such findings as to whether the flame is blue or pale due to perfect combustion, or red, or burning with black smoke due to imperfect combustion, or as to how large the flame is. The flame sensor is used as a sensor intended to keep monitoring of the condition of the flame in a combustion device to supply an appropriate amount of air or oxygen or to keep monitoring the condition of the flame in a flare stack such as a chemical plant to maintain a proper condition of combustion without giving cause of environmental pollution caused by burning with black smoke.

It is therefore an object of the present invention to provide a flame sensor which permits automatic monitoring and automatic control of the condition of combustion of the flame.

In one aspect of the invention, the flame sensor according to the invention is characterized by a rotating board having mounted thereon a band-pass filter of an infrared region containing wavelength of resonant radiation of carbon dioxide and a band-pass filter of an infrared region containing no such wavelength; a photoelectric conversion device for measuring intensity of radiation having passed said band-pass filter and a division circuit for providing a ratio of an output of said photoelectric conversion device containing the wavelength of resonant radiation of the carbon dioxide to an output of said photoelectric conversion device containing no such wavelength.

In another aspect of the invention, the flame sensor according to the invention is characterized by a rotating board having mounted thereon a band-pass filter of an infrared region containing wavelength of resonant radiation of carbon dioxide and a band-pass filter of an infrared region containing no such wavelength; a single photoelectric conversion device for measuring intensity of radiation having passed said band-pass filter; a division circuit for providing a ratio of an output of said photoelectric conversion device containing the wavelength of resonant radiation of the carbon dioxide to an output of said photoelectric conversion device containing no such wavelength and an addition circuit for providing the sum of said outputs.

BRIEF DESCRIPTION OF THE DRAWINGS

The present invention will now be described by reference to accompanying drawings wherein:

FIG. 1 shows results of actual measurement of the spectrum from the flame for the change in the condition of combustion. FIG. 1 shows such result observed at the place less than several meters apart from the flame.

In FIG. 1, an abscissa represents a wavelength and an ordinate represents intensity of radiation. The flame has a wide spectrum extending to ultraviolet range, however, the present invention makes use of radiation having wavelength in a middle infrared region the proportion of which radiation is comparatively small in the natural field or the light of an artificial illumination, in order to improve S/N ratio of the sensor. Thus FIG. 1 illustrates only the same range of wavelength. Radiation of wavelength of $4.4\mu$ is intensively observed from the flame which is perfectly burning with blue or pale flame, as shown by the curve a in FIG. 1. In this case, the radiation at the wavelength in the vicinity of $4.4\mu$ for example $3.8\mu$ is weak. Taking the intensity at the wavelength of $3.8\mu$ as representative of the wavelength near $4.4\mu$, a ratio of the intensity of radiation at the wavelength of $4.4\mu$ to that of radiation at the wavelength of $3.8\mu$ is a value ranging between about 10 and 30.

Figure 1:
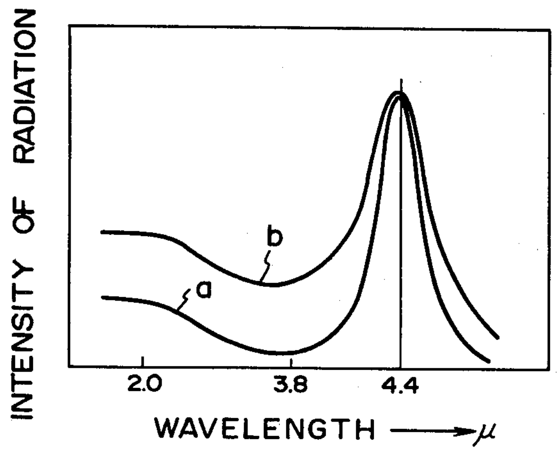
FIG. 1 illustrates a spectrum of an infrared region of a flame.

Next, when a fuel such as, for example gasoline is burnt with a red flame, the intensity of radiation varies as shown by a curve b shown in FIG. 1 and a ratio of the intensity of radiation at the wavelength of $4.4\mu$ to that at the wavelength of $3.8\mu$ will vary between about 2 and 4. On the other hand, the intensity of radiation at the wavelength of $4.4\mu$ will be of substantially the same order for the flame of substantially the same calorific value for the both conditions of combustion as above-mentioned.

It is possible to know the condition of combustion of the flames by observing the radiation of the flames having the wavelength of $4.4\mu$ and the wavelength in the vicinity thereof, for example $3.8\mu$ as above-mentioned.

Resonant radiation of $CO_2$ from the flame of the wavelength of $4.3\mu$ or $4.4\mu$ is selectively absorbed by $CO_2$ existing in the air and, as the distance from the flame to the point of observation becomes long, the ratio of the intensity of radiation at the wavelength of $4.4\mu$ to that at the wavelength of $3.8\mu$ will vary. This is because radiation of the wavelength in the vicinity of $3.8\mu$ is absorbed to the least extent by $CO_2$, $H_2O$ or the like in the air while radiation of the wavelength near $4.4\mu$ is absorbed by $CO_2$ to large extent.

Therefore, when the condition of combustion of the flame is detected in terms of intensity of radiation of the wavelength of 4.4μ and its vicinity, it is necessary to make correction in consideration of the distance from the flame.

Reference is now made to the result of the condition of combustion of the flame in the flare stack of a chemical plant as monitored as an example. The flare stack has a height of 80 m with the diameter at its top being 1 m. Usually a flame having a height of about 1 m burns at the top of the flare stack in the condition close to the substantially perfect combustion and sometimes a flame of several meters to several tens of meters is produced. A great amount of black smoke is sometimes given out. The flame sensor according to the invention was placed 200 m apart from the flare stack and measurement was made with respect to intensity of radiation and the condition of combustion of three wavelength band of 4.4μ, 4.0μ and 3.8μ. The result of measurement is given in the following table:

| | Perfect combustion | Orange flame | Red flame containing a little black smoke | Red flame containing much black smoke |
|---|---|---|---|---|
| 4.4μ/3.8μ | 2.5–3 | 2–1 | 1–0.5 | less than 0.5 |

It is possible to sense from the ratio of intensity of radiation of wavelength of 4.4μ to that of wavelength of 3.8μ whether the flame is burning perfectly, the flame is red, or the flame is burning with black smoke, as shown in the table. It is also possible to guess the content of carbon in a fuel, for example whether the fuel is methane, hexane or the like, from both the ratio and the amount of supplied air or the amount of vapor.

In this table, the ratio at the time of perfect combustion is between 10 and 30 for the distance of several meters in FIG. 1 while the ratio is between 2.5 and 3 for 200 m because radiation of wavelength of 4.4μ is selectively absorbed by $CO_2$ in the air on the way of 200 m from the flame to the point of observation.

The ratio has different meaning in dependence upon the distance of observation for such reason, however the amount of $CO_2$ in the air is substantially constant and the amount dependent upon the distance is absorbed. Thus correction is simple.

This invention utilizes the above-mentioned characteristics of radiations in a middle infrared region emitted from flames to detect the conditions of combustion of flames.

Figure 2:
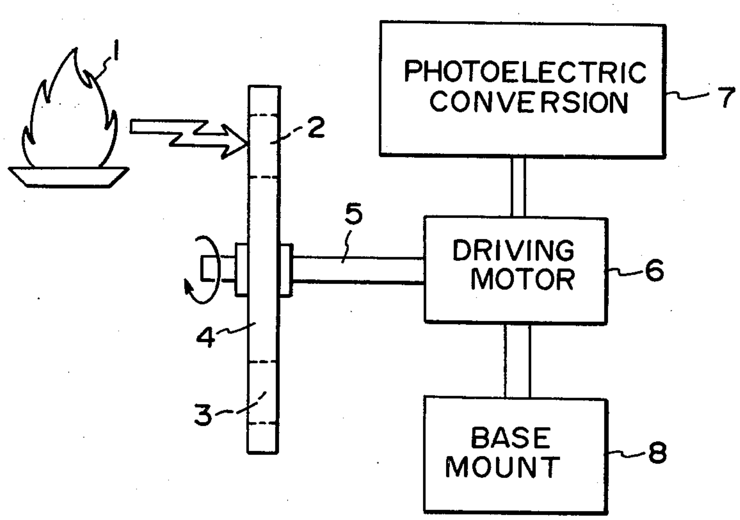
FIG. 2 illustrates a schematic structure of the flame sensor according to the present invention.

FIG. 2 is a schematic illustration of the arrangement.

In FIG. 2 reference numeral 1 designates a flame to be observed, 2 and 3 designates band-pass filters adapted to pass radiation of different wavelengths, 4 is a disc having the band-pass filters mounted thereon, 5 is a driving shaft for rotating the disc, 6 is a driving motor, 7 is a photoelectric conversion device (a light receiving element) for measuring intensity of the radiation having passed the band-pass filters 2, 3 and 8 is a base mount.

A single photoelectric conversion device 7 is provided for a plurality of band-pass filters. The photoelectric conversion device 7 is disposed in such a position that the band-pass filters 2, 3 take their alternate positions just in front of the device 7 when the disc 4 is rotated.

In other words, the photoelectric conversion device 7 sees a flame through the band-pass filters 2 and 3 alternately. If it is assumed that outputs of the photoelectric conversion device 7 derived by use of the band-pass filters 2 and 3 are E2 and E3, they will appear as shown in FIG. 3.

Figure 3:
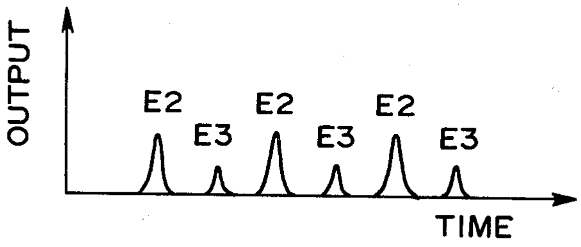
FIG. 3 illustrates an output of a photoelectric conversion device.

In FIG. 3, an abscissa represents time and an ordinate represents an output of the photoelectric conversion device 7. In the photoelectric conversion device 7 are used a semiconductor such as PbSe, a thin film thermistor or a pyroelectric effect element.

By feeding such output to a calculation circuit through a sampling circuit, the amount of light received from a plurality of band-pass filters can be measured by a single photoelectric conversion device. This brings about the following advantages. Light receiving elements used for receiving infra-red rays are generally expensive and conventionally such an expensive element is used for every band-pass filter. On the contrary, only one such element is sufficient as a whole and is economical.

Generally a light receiving element has sensitivity varying with an ambient temperature and a rate of such variation is not constant in a strict sense over a wide range of temperature for respective light receiving elements. Therefore, provision of a light receiving element for every band-pass filter causes occurrence of noises due to difference of temperature coefficient with the result that upper limit of sensitivity of a sensor is restrained and high sensitivity cannot be obtained. Receiving light with a single light receiving element removes this problem.

It is impossible to provide a plurality of light receiving elements having a quite constant thermal time constant and this may be a cause of noise in case of change in the ambient temperature. Provision of a single light receiving element disposes of this problem.

As mentioned above it is possible to measure inexpensively intensity of a plurality of wavelength band regions with a good S/N ratio by rotating a plurality of band-pass filters in front of a single light receiving element 7.

The output of the light receiving element 7 shown in FIG. 3 is fed through a sampling circuit to a calculation circuit where ratio of intensity of each wavelength and absolute value of each intensity is read out.

Figure 4:
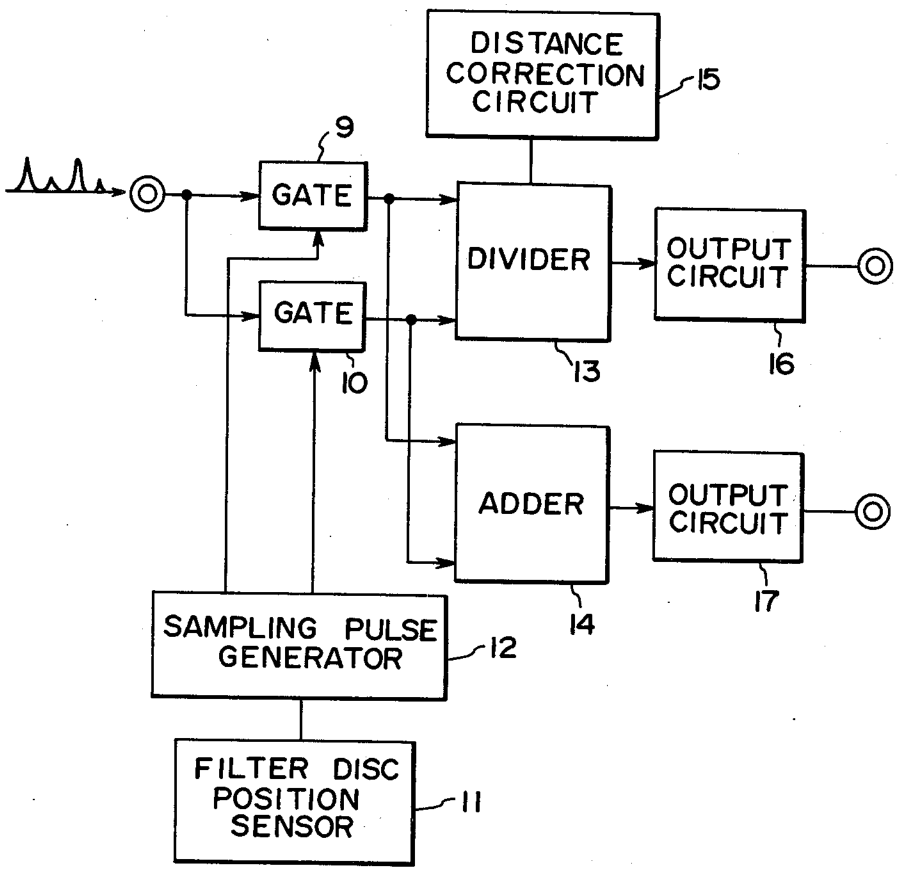
FIG. 4 illustrates a block diagram of one embodiment of a signal treatment circuit.

A block diagram of a typical circuitry is shown in FIG. 4.

In FIG. 4, reference numerals 9 and 10 designate gate circuits, reference numeral 11 is a sensor for sensing a rotary position of a filter disc, 12 is a sampling pulse generator which feeds gating pulses to the gate circuits 9 and 10 in order to sample the input applied to the gate circuits. The sampling pulse generator 12 is controlled by signals from the filter disc position sensor 11. The gate circuits 9 and 10 are opened at a proper time by setting timing to take in a signal. Reference numeral 13 designates a divider, 14 is an adder and 15 is a circuit for correction of operation of the divider in response to the distance from the flame to the sensor. Use is made as an example of a circuit for adjusting the gain of an amplifier for the wavelength of 4.4μ. Reference numerals 16 and 17 designates output circuits at which signals for control or warning of a flame are derived.

Referring again to FIG. 4, the divider 13 receives inputs commensurate to intensity of the radiation having passed the band-pass filters 2 and 3 which inputs are fed from the gates 9 and 10, and calculates a ratio of the intensity of the wavelength of 4.4μ as above-mentioned to that of the wavelength in the vicinity thereof, for example 3.8μ, containing no resonant radiation band of carbon dioxide with the result that an output comes out. The divider utilizes a single light receiving element 7 and influence of change in temperature on sensitivity can be neglected completely.

The output thus taken out indicates whether the flame is burning completely or with black smoke as exemplified in the table. The correction circuit 15 is used for correction in dependence upon the distance between the flame and the sensor. The rate of attenuation of the wavelength of 4.4μ in the air will be 0.48 for 100 m, 0.32 for 200 m and 0.12 for 500 m on the basis of the intensity for the distance "zero" being selected as 1.0.

It is sometimes desired to know the size of a flame as well as information on whether the flame contains black smoke or not when it is burning. In this case the addition circuit 14 is effective. The amount of heat generated in a unit time is substantially proportional to the intensity of the wavelength of 4.4μ among various size of flames. As a numerical value representative of apparent sizes, sum of the intensity of both wavelengths of 4.4μ and 3.8μ is comparatively appropriate. Accordingly provision of the addition circuit 14 enables knowledge of the size of the flame.

According to the present invention, there are provided a rotating disc 4 having a plurality of band-pass filters of infra-red region containing wavelength of resonant radiation of carbon dioxide, a single photoelectric conversion device 7 for measuring intensity of the radiation having passed the plurality of band-pass filters 2, 3 on the disc and an operation circuit for dividing the output of the photoelectric conversion circuit 7. A flame sensor can be obtained by which condition of combustion of the flame is sensed with high sensitivity over a wide range of temperature. It is also possible to sense the size of a flame by the sensor by the provision of the addition circuit 14 of the output of the band-pass filter. The flame sensor according to the invention has such practical effects as above described.

The invention has been described and illustrated with respect to one embodiment, but is not to be limited to this embodiment, but should be defined by the following claims.

We claim:

1. A flame sensor for monitoring the condition of a flame comprising a rotary disc having a first band-pass filter of an infra-red region containing a wavelength of a resonant radiation of carbon dioxide and a second band-pass filter of an infra-red region containing no such wavelength, a single photoelectric conversion device for measuring intensity of the radiation having passed said band-pass filters and a division circuit for providing a ratio of an output of the photoelectric conversion device containing the wavelength of the resonant radiation of the carbon dioxide to an output of the device containing no such wavelength.

2. The flame sensor for monitoring the condition of a flame as set forth in claim 1 further comprising a plurality of gates connected between the photoelectric conversion device and the division circuit; a sampling pulse generator adapted to control said gates; and a sensor for sensing the rotational position of the rotary disc and controlling the sampling pulse generator in response thereto.

3. A flame sensor for monitoring the condition of a flame as set forth in claim 2 further comprising a distance correction circuit associated with said division circuit for providing a correction factor thereto in dependence upon the distance between the flame and the photoelectric conversion device.

4. A flame sensor for monitoring the condition of a flame as set forth in claim 1 wherein said first and said second band-pass filters are adapted to pass radiation of different wavelengths, the wavelength passed by said first filter being greater than that passed by the second filter.

5. A flame sensor as set forth in claim 1 wherein the wavelength passed by said second filter is in the order of 3.8μ and that passed by said first filter is in the order of 4.4μ.

6. A flame sensor for monitoring the condition of a flame comprising a rotary disc having a first band-pass filter of an infra-red region containing a wavelength of a resonant radiation of carbon dioxide and a second band-pass filter of an infra-red region containing no such wavelength, a single photoelectric conversion device for measuring intensity of the radiation having passed said band-pass filters, a division circuit for providing a ratio of an output of the photoelectric conversion device containing the wavelength of the resonant radiation of the carbon dioxide to an output of the photoelectric conversion device containing no such wavelength, and an addition circuit for providing an output corresponding to the sum of said outputs of said photoelectric conversion device.

7. A flame sensor for monitoring the condition of a flame as set forth in claim 6 further comprising a plurality of gates connected between the photoelectric conversion device and the division and addition circuits, a sampling pulse generator adapted to control said gates and a sensor for sensing rotational position of the rotary disc and controlling the sampling pulse generator in response thereto.

8. A flame sensor for monitoring the condition of a flame as set forth in claim 4 wherein said first and second band-pass filters are adapted to pass radiation of different wavelengths, the wavelength passed by said first filter being greater than that passed by the second filter.

9. A method for monitoring the condition of a flame comprising sensing the radiation from the flame in an infra-red region, passing radiation of a first wavelength having a resonant radiation corresponding to that of carbon dioxide, passing radiation of a second wavelength having a magnitude less than said first wavelength, measuring the intensity of the radiation passed of each said first and said second wavelengths and determining the ratio of the intensity at the radiation of first wavelength to the intensity of the radiation of second wavelength and developing an output signal corresponding to said ratio.

10. A method for monitoring the condition of a flame as set forth in claim 8 wherein said step of measuring the intensity of the radiation passed includes developing a first signal corresponding to said radiation of first wavelength and a second signal corresponding to said radiation of second wavelength and adding said first and second signal to develop a signal corresponding to the size of the flame.

11. A method as set forth in claim 10 further including the step of correcting the output signal to reflect the rate of attenuation of radiation of said first wavelength between the flame and the location at which the radiation from the flame is sensed.

12. A method as set forth in claim 8 further including the step of correcting the output signal to reflect the rate of attenuation of radiation of said first wavelength between the flame and the location at which the radiation from the flame is sensed.

* * * * *